United States Patent [19]
Norton

[11] Patent Number: 5,163,791
[45] Date of Patent: Nov. 17, 1992

[54] DRILLING AID

[76] Inventor: Ralph Norton, 5101 SW., 163rd Ave., Fort Lauderdale, Fla. 33331

[21] Appl. No.: 765,662

[22] Filed: Sep. 26, 1991

[51] Int. Cl.⁵ .............................................. B23B 49/00
[52] U.S. Cl. ................................... 408/79; 408/72 R
[58] Field of Search ...................... 408/72 R, 75, 79

[56] References Cited

U.S. PATENT DOCUMENTS

| | | | |
|---|---|---|---|
| 171,546 | 12/1875 | Boe | 408/79 |
| 2,847,881 | 8/1958 | Allemann | 408/79 |
| 3,487,731 | 1/1970 | Coon | 408/79 |
| 4,728,230 | 3/1988 | Blum | 408/79 |

FOREIGN PATENT DOCUMENTS 7506  1/1984  Japan ............................... 408/72 R Primary Examiner—Daniel W. Howell
Attorney, Agent, or Firm—Jacobson, Price, Holman & Stern

[57] ABSTRACT

A pin locator device for use in positioning a drill relative to an already drilled hole in a workpiece for the purpose of drilling a line of equally interspaced holes in the workpiece is in the form of a spring plunger which can be depressed into the already drilled hole and released when the workpiece is properly situated for the next drilling operation.

9 Claims, 2 Drawing Sheets

DRILLING AID

BACKGROUND OF THE INVENTION

This invention relates to a device for use in drilling or boring a row of equally spaced holes in a workpiece.

It is frequently necessary to drill a row or line of equally spaced holes in planks, shelving units and the like. For example, in a shelving system it is necessary to have accurately equally spaced holes arranged in vertical lines on opposite shelf supports to insure that the shelves situated therebetween will be level.

It is know in the art to provide a drilling head, which may have one or more drills, with a locator pin horizontally spaced at a predetermined distance from a drill. The pin is used accurately to space a line of holes apart by positioning the pin in an already drilled hole and using its spacing from the drill itself to set up the distance accurately for drilling the next hole.

It is an object of the present invention to provide a novel form of pin locator of the above type which is simple to manufacture and easy to use and which can be provided as part of a drill assembly or as an attachment for such an assembly.

SUMMARY OF THE INVENTION

A pin locator in accordance with the invention comprises an elongate bar with an elongate slot at one end and a depressible pin in the form of a spring-loaded plunger at the opposite end. In a preferred form of the invention, the pin has an enlarged head at its upper end and a coil spring trapped between the head and the bar urging the pin upwardly away from the bar. In use, when attached to a drill head in spaced relation to a drill, the pin can be depressed against the spring bias into an already drilled hole in order to set up the distance between that hole and the next hole to be drilled in line. When pressure is released from the head of the plunger, the plunger springs upwardly out of the already drilled hole. A transverse stop pin may be provided at the lower !Q end of the pin under the bar.

The slotted bar enables the device readily to be attached to an existing drill head by a pair of bolts or the like.

Additional features and advantages of the invention will become apparent from the ensuing description and claims taken in conjunction with the attached drawings.

DESCRIPTION OF PREFERRED EMBODIMENT

Figure 1:
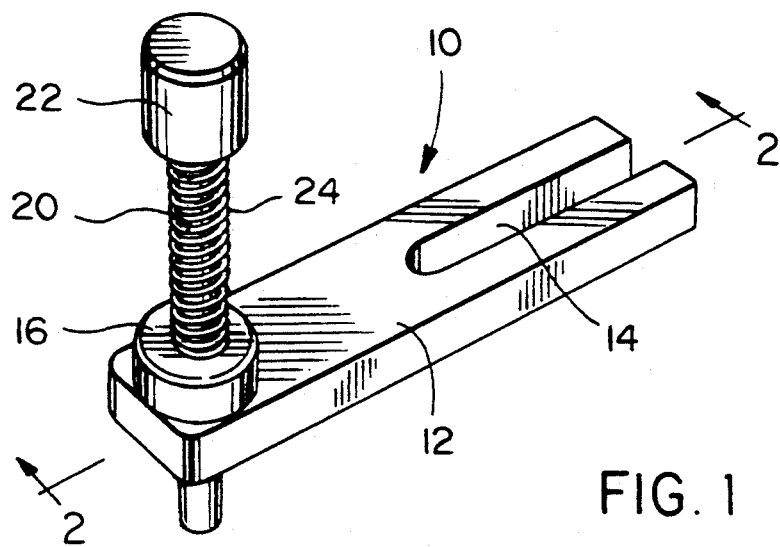
FIG. 1 is a perspective view of a locating pin device according to the invention.
Figure 2:
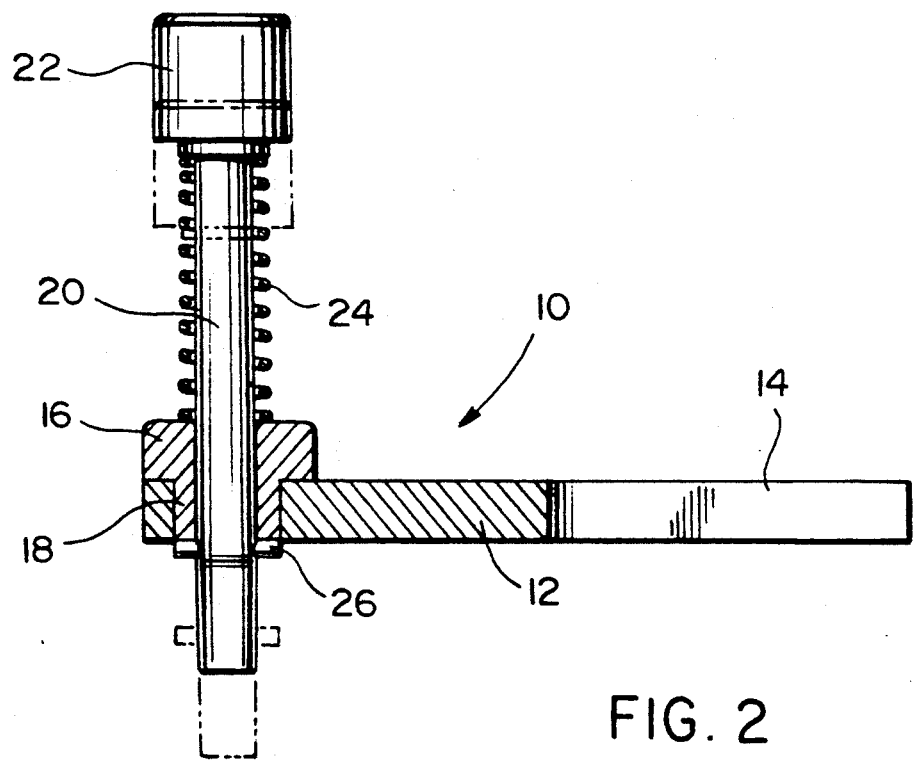
FIG. 2 is a sectional view on line 2—2 of FIG. 1.

Referring initially to FIGS. 1 and 2, there is illustrated a pin locator device in accordance with the invention generally indicated by reference 10. The device includes an elongate metal bar 12 with an elongate slot 14 at one end. At its other end the bar has a collar 16 with a flange 18 which is a force fit in a bore formed through the bar. Mounted for vertical reciprocatory removement in the collar 16 is a pin or plunger 20 with an enlarged head 22 at its upper end. A coil spring 24 is mounted around the pin 20 between the collar 16 and the head 22 in order to urge the pin upwardly away from the bar in the direction of the head. A transverse stop pin 26 extends through pin 20 below bar 12 to limit upward movement of the pin by engaging the under side of flange 18. A length of the pin 20 extends below the stop pin 26.

Figure 3:
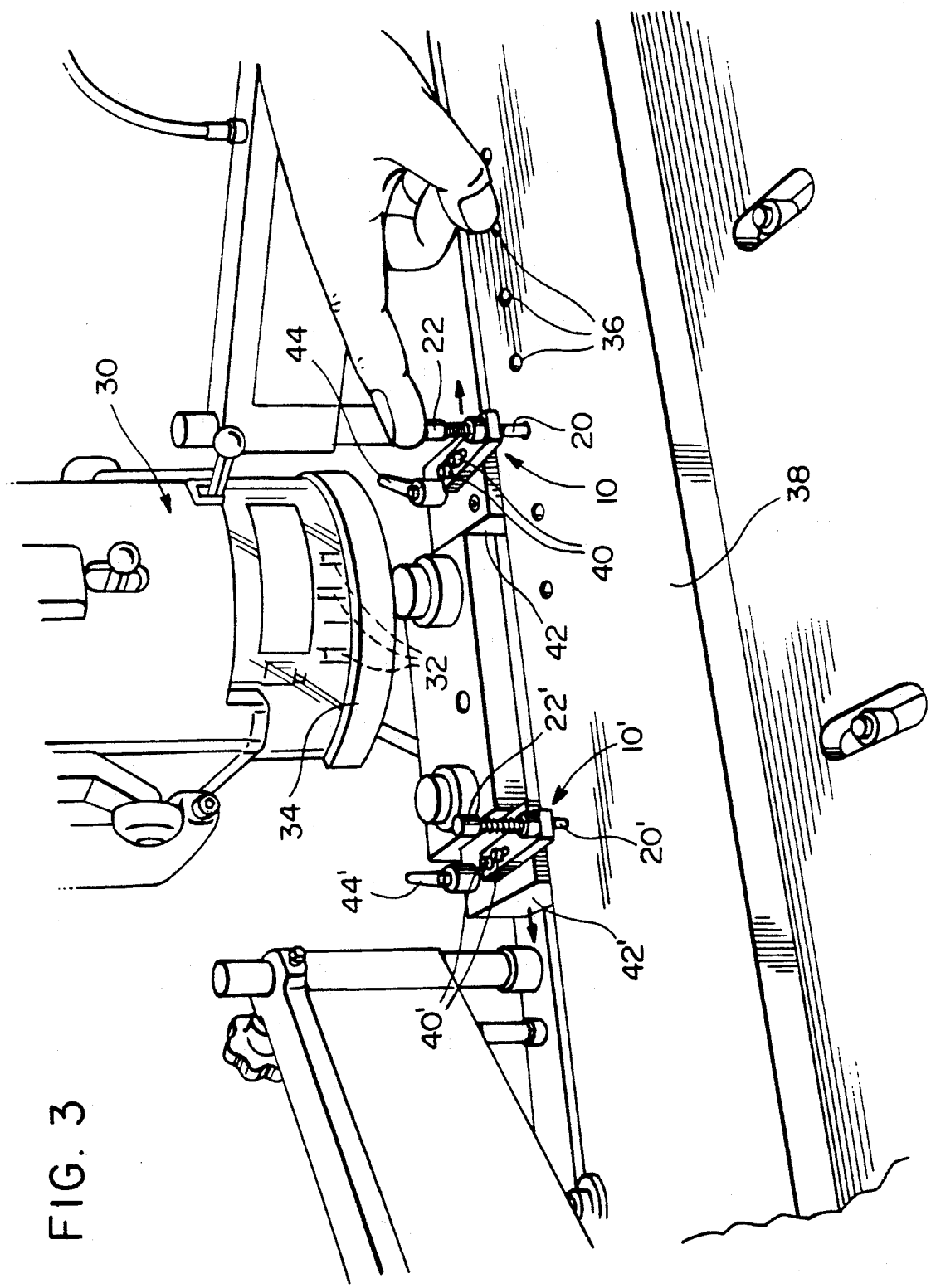
FIG. 3 is a perspective view of the device shown in FIGS. 1 and 2 in combination with a drill head for use in forming a row of equally spaced holes in a workpiece.

Use of the device shown in FIGS. 1 and 2 is illustrated by way of example in FIG. 3 which shows a drilling head 30 which may for example have three equally interspaced drills 32 behind a guard 34, the drills being used to form a line of equally interspaced holes 36 in an elongate workpiece 38 which may, for example, comprise a shelving upright or the like. As shown in FIG. 3, a first pin locator device 10 is attached to a base block 42 adjacent the drilling head on the right hand side of the Figure and a second pin locator device 10' is similarly positioned on a base block 42' the left hand side of the Figure. The respective devices 10 and 10' may be attached to the blocks 42, 42' through the respective slots 14 by means of respective pairs of set screws 40 and 40'. The pins 20 and 20' will be spaced laterally relative to the drills 32 at a distance related to the required spacing between the holes 36.

In use, after having drilled a first set of three holes in the workpiece 38, the workpiece is shifted to the right (for use of the right hand device 10) until the pin 20 aligns with the central one of the already drilled holes. This hole is used as a gauge mark for the next set of three holes to be drilled by depressing the plunger 20 into the already central hole by finger pressure as shown. This operation sets up the positioning of the workpiece 38 for the next set of three holes. In the Figure, holes which have not yet been drilled are shown dotted. When the workpiece has been properly aligned by means of the plunger 20, the plunger can be released to spring out of the hole, and the next holes can be drilled with the workpiece suitably clamped or otherwise held. The above process can then be repeated for subsequent sets of three holes along the required length of the workpiece. The left hand pin locator device 10' can be used for incrementally moving the workpiece in the right to left direction for a similar hole drilling operation for example at the opposite side of the workpiece to provide accurately aligned holes on both sides thereof.

The blocks 42, 42' may be adjustably mounted on slides (not shown) to change the distance of pins 20, 20' from the drills and vary the distance between the drilled hole or groups of holes. The blocks can be fixed in position by screw lever locks 44, 44'.

It will be evident that a spring plunger type pin locator as described above can be incorporated in a drill apparatus or it can be supplied as a separate screw-on item.

While only a preferred embodiment of the invention has been described in detail, the invention is not limited thereby and modifications can be made within the scope of the attached claims.

I claim:

1. A locator device for use with drilling apparatus for positioning a workpiece relative to a drill when drilling a line of equally interspaced holes in the workpiece, said device comprising an elongate bar having a longitudinal axis, elongate mounting means at one end of the bar extending along said axis for attaching the device to a drilling apparatus, a plunger extending through the bar at an opposite end of the bar, the plunger being located on said axis, an enlarged head on the plunger on one side of the bar, a coil spring surrounding the plunger between the head and the bar urging the plunger away from the bar, and stop means on the plunger on an opposite side of the bar for limiting movement of the plunger away from the bar, the plunger projecting beyond the stop means.

2. A device as claimed in claim 1 wherein the mounting means comprises an elongate slot in the bar.

3. A device as claimed in claim 1 wherein the stop means comprises a transverse pin extending through the plunger.

4. A device as claimed in claim 1 further including a collar surrounding the plunger, the collar having a flange extending through the bar and the spring being mounted on the plunger between said head and the collar.

5. Drilling apparatus comprising a drill head for at least one drill and a pin locator device for use in positioning the drill relative to a hole already drilled in a workpiece when drilling a line of equally spaced holes in the workpiece by downward movement of the drill, said device comprising an upwardly biased spring plunger mounted at a distance from the drill related to a required spacing between the holes.

6. Apparatus as claimed in claim 5 wherein the plunger is releasably attached to a base member of the apparatus.

7. Apparatus as claimed in claim 6 wherein the plunger is carried on a bar attached by screws to the base member.

8. Apparatus as claimed in claim 5 wherein the plunger is carried on a bar attached to the apparatus, the plunger having an enlarged head and a coil spring surrounding the plunger between the bar and the head urging the plunger away from the bar.

9. Apparatus as claimed in claim 6 wherein the base member is adjustably movable relative to the drill for changing the spacing between holes.

* * * * *